Figure 1:
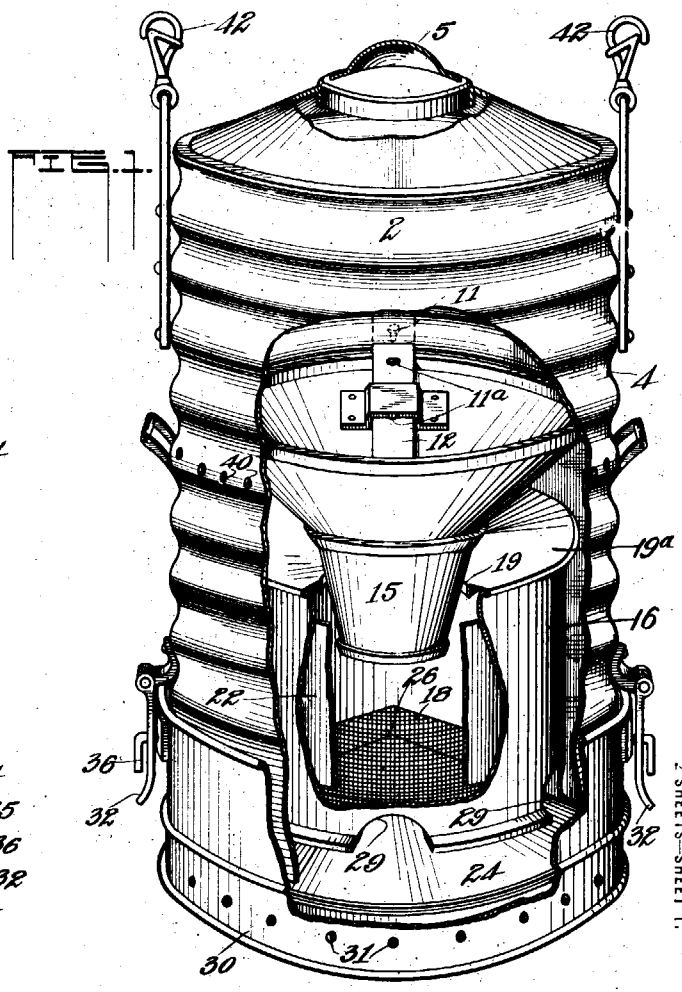

W. M. BAXTER.

CHARCOAL BURNER.

APPLICATION FILED MAR 16, 1918.

Reissued May 20, 1919.

14,648.

2 SHEETS—SHEET 1.

INVENTOR.

William M. Baxter by W. V. Tefft

ATT'Y

W. M. BAXTER.

CHARCOAL BURNER.

APPLICATION FILED MAR. 16, 1918.

Reissued May 20, 1919.

14,648.

2 SHEETS—SHEET 2.

INVENTOR.

William M. Baxter by W. V. Tepple

ATT'Y

UNITED STATES PATENT OFFICE.

WILLIAM M. BAXTER, OF CHICAGO, ILLINOIS, ASSIGNOR, BY DIRECT AND MESNE ASSIGNMENTS, TO WILLIAM H. KLAUER, OF DUBUQUE, IOWA.

CHARCOAL-BURNER.

14,648. Specification of Reissued Letters Patent. Reissued May 20, 1919.

Original No. 1,188,880, dated June 27, 1916, Serial No. 757,916, filed March 31, 1913. Application for reissue filed March 16, 1918. Serial No. 222,981.

*To all whom it may concern:*

Be it known that I, WILLIAM M. BAXTER, a citizen of the United States, residing at Chicago, in the county of Cook and State of Illinois, have invented new and useful Improvements in Charcoal-Burners, of which the following is a specification.

My invention relates to heating and preserving devices, and is particularly adapted for use in transportable containers, wherein fruit, vegetables and other perishable products are carried to distant points.

My invention relates more particularly to a heater designed to burn charcoal or similar fuel for the purpose of maintaining a uniform heat for a long period of time and also for the purpose of furnishing a product of charcoal combustion (carbon-monoxid) in sufficient quantities to destroy germs and effectively retard the ripening process or normal development of the products within the container.

An object of the invention is to provide a heater, having a fuel supply that will furnish without special attention, a pre-determined uniform heat, for a given length of time.

Another object is to provide means whereby the draft and depth of the fire may be controlled to regulate the amount of heat and carbon-monoxid gas furnished by the heater.

Another object is to provide a combustion chamber with a restricted draft opening for the discharge of gases therefrom, whereby carbon-monoxid is produced in large quantities.

A further object is the provision of means for regulating the draft opening from the combustion chamber in proportion to the depth of the fire so as to regulate the quantity of carbon-monoxid produced and given out by the heater.

Another object is to inclose the burning charcoal in a compartment and prevent admission of oxygen thereto above the burning fuel so as to promote the production of carbon-monoxid.

Another object is to construct the heater with the combustion chamber spaced from the outer wall and base of the heater to provide a surrounding air space whereby radiation of heat from the combustion chamber will be prevented and danger of fire to the car or container minimized.

Another object is to provide a construction wherein draft openings are arranged indirectly so that burning embers will not escape from the heater in case the heater is overturned, or otherwise disturbed.

Still another object is to provide means whereby the heater may be suspended from the ceiling of the car or safely supported upon the floor of the car.

Of what it consists and its manner of construction and mode of operation, will be fully set out, described and illustrated in the following specifications, when read in connection with the drawings accompanying the same and forming a part thereof.

Figure 2:
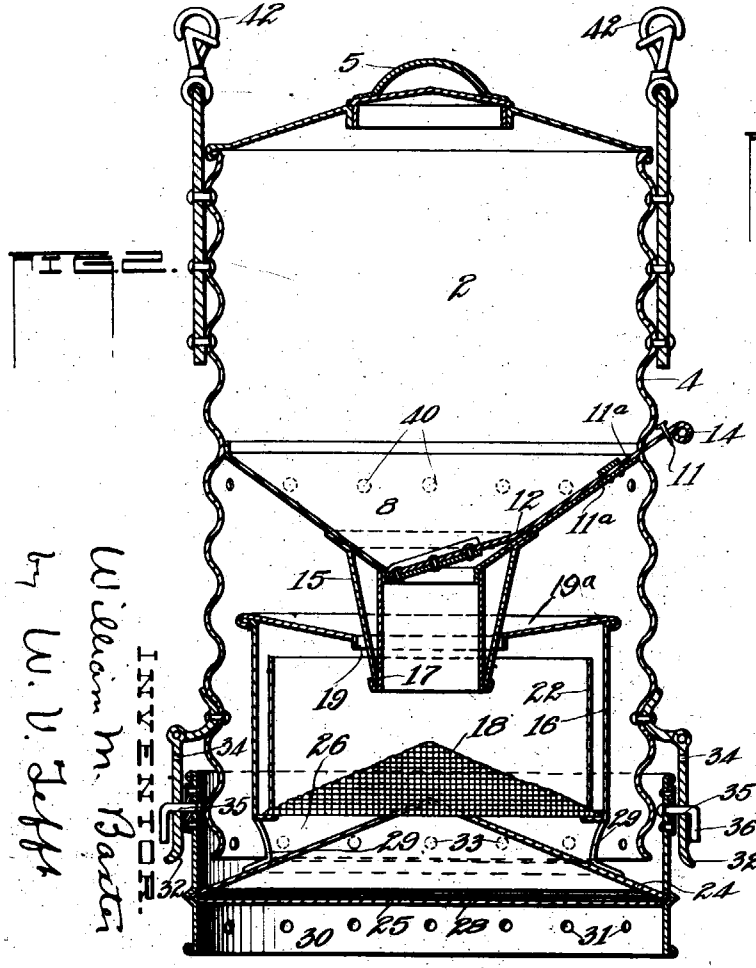
Figures 2, 4, 5:
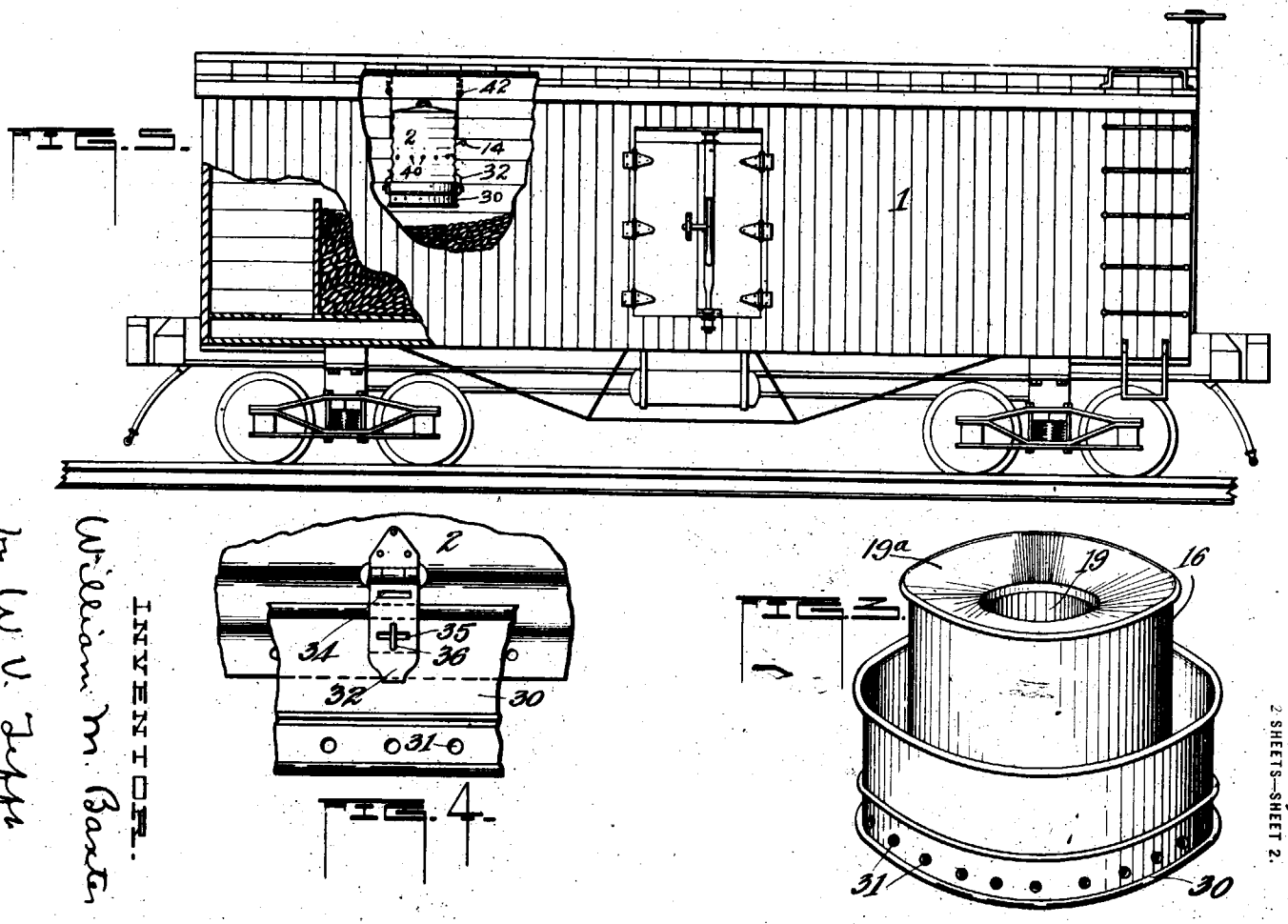

Figure 1, is a perspective view of the device with a part cut away showing the fire pot and surroundings; Fig. 2, is a vertical sectional view of a heater, Fig. 3, is a perspective view of the fire pot and base. Fig. 4, is a face view of the adjusting hasp and portions of the heater casing to which it is attached; and Fig. 5, is a side view of an ordinary freight car, used for transporting this class of goods, a portion of the car being broken away to show my heater applied therein.

Fruit, vegetables and other analogous products, when exposed to normal conditions will continue to develop and ripen, after they are removed from the plant, upon which they are grown, and after becoming fully ripe, will deteriorate. In order to transport these products to distant points, requiring a considerable period of time, and also in some cases where it is desired to store the products for a time, it is not only necessary to maintain a certain temperature to prevent injury to such products but it is also desirable to provide means to destroy germs, etc., and also to retard the ripening process or development so that they will arrive at their destination in good condition. Oxygen is the element which promotes ripening and if the quantity of oxygen is limited, the ripening will be accordingly retarded, and if oxygen is entirely excluded, the products will become lifeless and lose the property of continuing to ripen.

My invention is designed not only to provide a medium for furnishing the required amount of heat to maintain products at a uniform pre-determined temperature for a given period of time, although it may be used for this purpose alone, but it is designed more particularly and has a greater utility in providing in addition to the heat furnished thereby, a considerable quantity of carbon-monoxid which, when confined in a container, with ripening products, destroys germs, etc., and retards the ripening or development of the products sufficiently so that they may be transported long distances or maintained in storage for a considerable period of time, without appreciable ripening.

Oxygen is required to support combustion and in use my heater takes up oxygen from the containers and gives off carbon-monoxid gas, which discharges into the container. This reduces the percentage of oxygen in the container, which is sufficient to prevent extinction of life in the products (after which they would be incapable of further ripening) but is insufficient to support normal ripening or development and in the operation of the heater, it continues to take up oxygen and replenish the supply of carbon-minoxid so that the products are continually maintained in this retarded ripening condition.

The carbon-monoxid also serves another useful purpose in connection with the disseminating or distribution of the heat. As it passes from the heater, it is lighter than the atmosphere of the container, and rises to the top thereof. As it cools, somewhat, it becomes heavier than the atmosphere and sinks to the bottom of the car, but at the same time retains a greater amount of heat than the air, which it replaces, and results in giving a greater warmth to the products at the floor of the container and maintains a more even distribution of heat throughout.

In the accompanying drawing, which illustrates a form of device embodying my invention, like characters of reference, denote corresponding parts in each of the drawings.

1, is a freight car of the type commonly used for transporting fruit, vegetables and other analogous products, within which my charcoal burner may be suspended, as shown or otherwise, mounted.

2, designates the casing or shell of my heater device, which is constructed of a tubular sheet metal part, preferably formed with corrugations 4, and this tubular part has a top secured to the upper end thereof with a fuel opening which is normally closed by the removable lid or cover 5. Within the upper end of the casing is formed a magazine 8, for the charcoal, which magazine has a conical bottom, through the center of which is an opening controlled by a slide 12, which said slide is provided with a handle 14, that projects through the shell (and is provided with holes $11^a$, through which a pin 11 is inserted) to control the position of the slide over the opening in the base of the conical portion of the magazine. Secured to the conical bottom of the magazine is a tapering tube 15, formed with an inner member 17, connected to the rim of the opening in the bottom of the magazine and extending downwardly therefrom, as shown; this construction providing an air space between said members forming tube 15 for the purpose of preventing pre-ignition of the fuel in the feed-tube 17, before it falls to the fire on the grate. Surrounding and extending below the tube 15 is a circular fire box 16, which has a top $19^a$, the said top being provided with an opening 19 therein, of substantially the size of the largest part of the tapering tube 15 through which opening 19 projects said tube 15, and by which the draft and gases are controlled. Within the fire-box is a conical shaped grate 18 preferably made of braided or woven wire. Within the fire-box 16 is a sheet metal tube 22 which rests upon the grate 18 and prevents the fuel from coming in contact with the fire-box 16, thus preventing the fire-box from burning out, and also creating a diffusion of heat in the fire-box, which prevents the shell 16 from radiating too much heat to the shell 2, at one place but distributing the heat over a large area of the shell. If the tube 22 burns out it can be readily replaced.

Below the fire-box is an ash receiver 24, which is of conical shape, similar to the grate surface 18, and the fire-box is supported on this ash receiver 24 by means of an extension 26, which projects downwardly from the fire-box casing 16 and is secured to the ash receiver 24,—a suitable distance being provided between the grate 18 and ash receiver 24 to allow for the reception of the ash deposit from the grate 18 and also to provide for circulation of air. This downwardly extending portion 26 is provided with a number of draft openings 29 therein, which openings extend down to the surface of the ash receiver as shown, so as to provide an outlet for the ash deposit from under the grate surface 18. This ash receiver 24 is disposed intermediate of the ends of a tubular casing 30, the lower portion of which, below the ash receiver 24 forms a base or support for the entire heater; the distance from the ash receiver 24 to the lower end of casing 30 being sufficient to hold the heater far enough above the floor, so that there is no danger of heat being communicated from the heater to the floor. To further prevent downward radiation of heat there is provided a plate or bottom 25 secured in the casing 30, immediately below the ash receiver 24, which has a number of sheets 28 of asbestos or some other heat non-conducting material thereon. The casing 30 below the plate 25 is provided with a number of holes 31 for free circulation of air, and this together with the sheets 28 of heat non-conducting material and the dead air space formed between the plate 25 and the ash receiver 24 effectually prevent downward radiation of heat from the combustion chamber.

The casing 30 extends a suitable distance above the ash receiver 24 and loosely telescopes the lower end of the casing 2, so as to provide an air space between the telescopical walls thereof for admission of air to the lower part of the combustion chamber. For securing the casing 30 and the casing 2 together, there are a number of hasps 32 which are secured around the lower portion of the casing 2, these hasps each having a number of slots 34 and 35 through which the buttons 36 on the casing 30 may be passed for securing the two casings 30 and 2 together. As is apparent, the hasps allow adjustment whereby the casing 2 may be inserted and secured at different distances within the casing 30 and in order that there may be free communication of air to the bottom of the combustion chamber, in all positions of adjustment there are provided a number of openings 33 in the casing 2 at the lower end thereof.

In practice, it is often desirable to suspend the heater from the ceiling of the car and for this purpose casing 2 is provided with hooks 42 at the upper end whereby the entire heater may be suspended.

In using my device, the pin 11 is removed and the slide 12 is forced down and closes the opening in the base of the magazine. Then the buttons 36 are turned and the hasps 32 are unlocked from the buttons and the entire casing with the magazine is removed from off the firepot. The fire is started on the grate 18 with a small quantity of charcoal. After it comes to a glow the magazine is filled with the fuel and then the casing is replaced and locked by the buttons 36. The slide 12 is pulled out by means of the handle 14 to full open position and the pin 11 inserted to retain it in this position. As soon as the slide is removed the fuel in the magazine 8 passes down within the fuel tube 17 onto the fire on the grate, and then as the fuel is consumed it is supplied from the magazine by gravity.

Assuming that the heater parts are in the position indicated in Fig. 2, fuel will be deposited from the magazine 8 onto the grate surface 18 until the fuel in the combustion chamber reaches the lower end of the fuel tube 17. As the fuel is consumed and settles on the grate surface 18, a fresh supply will be automatically fed from the spout 17.

If it is desired to decrease the depth of the fuel on the grate surface 18, the buttons 36 are released so as to allow hasps 32 to be withdrawn from engagement therewith and the entire casing 2 is inserted still farther within casing 30 until the upper openings 34 in the hasps 32 are in position to engage with the buttons 36. These parts are then secured together by means of the buttons 36.

The insertion of the casing 2 within the casing 30 projects the tapering tube 15 and fuel tube 17 farther within the opening 19 of the combustion chamber thereby decreasing the draft passage way through the opening 19 and decreasing the distance between the lower end of the tube 17 and the grate surface 18. It will require a less quantity of fuel on the grate surface 18 to reach the bottom of the fuel tube 15 and a thinner layer of fuel will be maintained on the surface 18. The diminishing of the draft opening 19 above mentioned will cause the fuel to burn more slowly and the heat radiated from the combustion chamber will be correspondingly lessened.

It will be observed that with the method of fastening the heater casings together by means of the hasps 32, there is little danger of the heater coming apart and furthermore, the construction of the combustion chamber is such and the construction of the draft passage to the bottom of the combustion chamber so indirect, that there is practically no danger of any burning embers escaping from the heater, if overturned.

Referring to the particular features of my device, which are instrumental in producing carbon-monoxid gas, it will be noted that I have a combustion chamber which is entirely inclosed except that provision is made for free entrance of air below the reticulated bottom thereof and a restricted draft opening is provided at the top, which may be regulated to control the exhaust of gases therefrom.

Oxygen is required to support combustion and enters below the reticulated bottom of the combustion chamber and as it enters the combustion chamber and comes in contact with the burning charcoal, carbon dioxid is formed, and as it passes up through the burning charcoal, it unites with carbon and emerges from the surface of the burning charcoal in the form of carbon-monoxid. If the combustion chamber were not closed and oxygen were supplied to the combustion chamber above the fuel surface, it would unite with the carbon-monoxid or burn. To preserve the carbon-monoxid therefore, the combustion chamber is closed above the burning fuel and the draft outlet is limited or arranged so as to permit escape of carbon-monoxid from the combustion chamber and prevent entrance of oxygen thereto, and the carbon-monoxid thus formed passes out through the openings 40 into the compartment in which the heater is located.

From the foregoing, it will be noted that I have not only provided a heater which will provide a uniform heat for a long period of time, without any attention whatever, and also having means for regulating the amount of heat, but I have also provided a construction which will furnish carbon-monoxid in required quantities to effectively preserve perishable products in a car or other container for a long period of time without decay or noticeable ripening.

What I claim is:—

1. In a heater, in combination, a combustion chamber having a grated bottom, double side walls spaced from each other, and a top closure wall overlying the upper edge of the double side walls and extending inwardly toward the vertical center of the combustion chamber, a support for the combustion chamber, a fuel magazine provided with an outlet for communication with the combustion chamber, a casing connecting the fuel magazine with the support for the combustion chamber spaced from the latter and provided with inlets to permit air to enter at points below the combustion chamber and for circulation through the space between said combustion chamber and the casing and provided with outlets to permit the escape of gases from the inclosure.

2. In a heater, in combination, a combustion chamber having a grated bottom, double side walls spaced from each other and a top closure wall overlying the upper edge of the double side walls and extending inwardly toward the vertical center of the combustion chamber, a support for the combustion chamber, a fuel magazine provided with an outlet for communication with the combustion chamber, a casing connecting the fuel magazine with the support for the combustion chamber, spaced from the latter and provided with air inlets for admission of air within the inclosure and with outlets for the escape of gases therefrom.

3. In a heater, in combination, a combustion chamber, a base spaced from the combustion chamber and suitably supporting the same, and provided with upwardly extending, circumferential, walled portions, a magazine provided with an outlet chute, a casing depending from the fuel magazine, surrounding the combustion chamber and suitably spaced therefrom, members suitably correlated to facilitate vertical adjustment relatively of the base and the casing to control the air circulation through the combustion chamber, inlets for the admission of air to points within the inclosure, and outlets for the escape of gases therefrom.

4. In a charcoal heater, in combination, a fire pot and a magazine spaced apart, the former below the latter, the fire pot having a grated bottom portion, closed side walls and an inwardly extending flanged portion partially closing the top thereof, but open sufficiently, approximating its central portion, to permit discharge of fuel thereinto, the circulation of air therethrough and the escape of gases therefrom, the magazine provided with a discharge spout communicating for discharge through the opening in the top portion of the fire pot and means for varying the spaced relation between the grate of the fire pot and the discharge outlet opening from the magazine whereby the escape of the products of combustion from the combustion chamber is retarded and carbon monoxid is generated in abundance, and a casing connecting the magazine with the fire pot and provided with air inlet ways for communication of air to the grate, and with discharge openings for permitting the escape of gases generated in the heater to points without.

5. In a heater, in combination, a base portion, a fire pot spaced from said base portion, adapted to burn charcoal and provided with a grate and having a top closure portion provided with an inlet opening, a magazine communicating for discharge through the opening into the fire pot, and disposed with relation to said opening and with the grate of said fire pot in a manner to retard normal combustion for the purpose of producing carbon monoxid gas, a casing provided with outlet openings adjacent the top of the fire pot, and connecting the magazine and the base portion and provided with inlet openings at points adjacent the space below the fire pot and communicating therewith and with the space between the fire pot and the casing for communication both with the space above and below said fire pot, whereby air is supplied to the fire pot and also to the space between the fire pot and the casing to cool the outer wall of the former, and also communicates with the space above the fire pot to be commingled with the carbon monoxid gas.

6. In a device of the class described, the combination of a combustion chamber provided with a restricted draft opening in the top and with a reticular bottom, a fuel magazine communicating through the opening in the fire pot with the interior of the combustion chamber in a manner to restrict the escape of gases therefrom and the circulation of air therethrough for the purpose of retarding combustion therein to produce carbon monoxid gas, a wall spaced from the combustion chamber to form a space below the same, communicating through the said reticular bottom with said combustion chamber, a casing provided with air inlet openings adjacent the space below the fire pot and with gas outlet openings adjacent the top thereof consisting of separable parts inclosing and spaced from the combustion chamber and forming a draft passageway therebetween, said passageway communicating with the draft space below the combustion chamber.

7. A combined heater and carbon monoxid generator for the purposes herein set forth, comprising, a substantially inclosed vertical fire pot provided with an outlet for the products of combustion located in the upper portion thereof, a grate supported in said fire pot, a fuel magazine for feeding fuel into the fire pot, an outer casing provided with an inlet in its lower portion for supplying air to the fire pot and an exhaust opening for the products of combustion and air above said inlet and leading directly to the atmosphere, said casing surrounding the fire pot and spaced from the vertical side wall of the latter to form an air passage exterior of the fire pot through which a portion of the air supplied by the inlet in said casing is diverted from the fire pot, the inlet and exhaust openings of the fire pot being within the casing and the inlet to the casing being of restricted capacity with respect to the passage through and around the fire pot, whereby a relatively restricted draft is produced in the fire pot, combustion in the fire pot is retarded and carbon monoxid is generated which exhausts through the fire pot outlet into the surrounding air chamber and thence through the casing outlet directly into the atmosphere surrounding the casing.

8. A combined heater and carbon monoxid generator for the purposes herein set forth, comprising, a substantially inclosed vertical fire pot provided with an outlet for the products of combustion located in the upper portion thereof, a grate supported in said fire pot, a fuel magazine for feeding fuel into the fire pot, an outer casing provided with a series of inlet holes in its vertical wall for supplying air to the fire pot and a series of exhaust holes for the products of combustion and air above said inlets and leading directly to the atmosphere, said casing surrounding the fire pot and spaced from the vertical side wall of the latter to form an air passage exterior of the fire pot through which a portion of the air supplied by the inlets in said casing is diverted from the fire pot, the inlet and exhaust openings of the fire pot being within the casing and the inlets to the casing being of restricted capacity with respect to the passage through and around the fire pot, whereby a relatively restricted draft is produced in the fire pot, combustion in the fire pot is retarded and carbon monoxid is generated which exhausts through the fire pot outlet into the surrounding air chamber and thence through the casing outlets directly in to the atmosphere surrounding the casing.

9. A combined heater and carbon-monoxid generator for the purposes herein set forth, comprising, a substantially-inclosed interior fire pot provided with an outlet for products of combustion located in the upper portion thereof, a fuel magazine for feeding fuel into the fire pot, an outer casing provided with an air inlet in its lower portion and an exhaust outlet for products of combustion and air above said inlet and leading directly to the atmosphere, said casing surrounding the fire pot and spaced from the vertical side wall of the latter, whereby the fire pot is substantially surrounded by a chamber in which is maintained a relatively free circulation of air and a grate supported in said fire pot above the bottom of the casing and through which air supplied by the casing inlet is admitted in relatively restricted quantities to the interior of the fire pot, whereby combustion in the fire pot is retarded and carbon monoxid is generated which exhausts through the fire pot outlet into the surrounding air chamber and thence through the casing outlet directly into the atmosphere surrounding the casing.

In testimony whereof I affix my signature in the presence of two witnesses.

WILLIAM M. BAXTER.

Witnesses:
D. D. Frix,
W. V. Teffit.